No. 801,029. PATENTED OCT. 3, 1905.
J. MARDIS.
OVERSHOE HOLDER.
APPLICATION FILED DEC. 31, 1904.
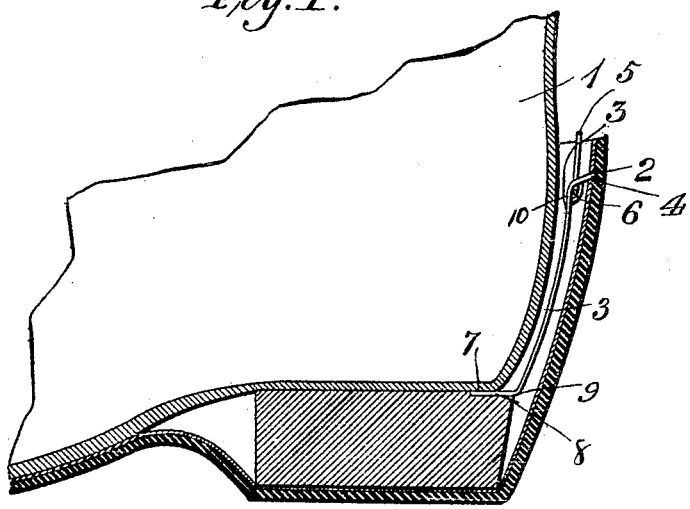
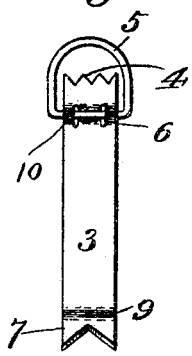
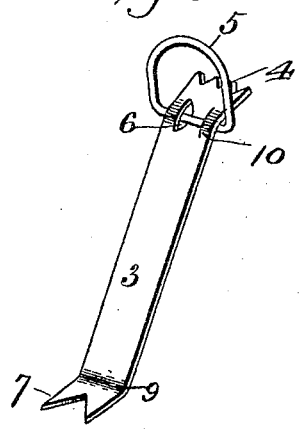
Witnesses
W. H. Ourand
F. L. Ourand
Inventor
Jackson Mardis
By John A. Saul
Attorney

UNITED STATES PATENT OFFICE.

JACKSON MARDIS, OF STRONGSTOWN, PENNSYLVANIA.

OVERSHOE-HOLDER.

No. 801,029.  Specification of Letters Patent.  Patented Oct. 3, 1905.

Application filed December 31, 1904. Serial No. 239,229.

*To all whom it may concern:*

Be it known that I, JACKSON MARDIS, a citizen of the United States, residing at Strongstown, in the county of Indiana and State of Pennsylvania, have invented certain new and useful Improvements in Overshoe-Holders, of which the following is a specification.

My invention relates to overshoe-holders or the like for preventing overshoes or rubbers from being pulled off by mud or similar substances; and the object thereof is to so construct the same that it may be easily attached or detached from the shoe and can be easily and cheaply manufactured.

In the drawings forming a part of this specification, and in which like symbols of reference represent corresponding parts in the several views, Figure 1 is a sectional view of a shoe and rubber with my invention applied thereto. Fig. 2 is a front view of the fastener detached from the shoe, and Fig. 3 is a perspective view of the same.

1 represents a shoe to which my device is shown applied; 2, the overshoe or rubber; 3, the fastener; 4, teeth or serrated edge for gripping the rubber, and 5 a bail for manipulating the device.

6 represents slits or slots cut in the metallic strip or fastener 3 for the insertion of the bail 5; 7, teeth for engaging the shoe.

8 shows the point of attachment of the shoe, and 9 a bend or angle in the fastener at the base thereof.

10 is a bend or angle at the top of the strip, the same extending in an opposite direction from the bend 9.

The operation of the device will be apparent from the foregoing. The points 7 are first driven into the shoe at the rear thereof between the heel and upper. The rubber is drawn upon the same, the prongs 4 engaging the top of the rubber, and the rubber thereby locked to the upper. When it is desired to remove the rubber, the bail is operated by the insertion of a finger or otherwise, the points 4 withdrawn from the rubber, and the rubber released. In the case of new rubbers, where the same fit closely or snugly to the shoe, it is often desirable to drive the point 7 in the side of the shoe instead of the back, and the rubber can be easily slipped upon the same and used in this position until the rubber relaxes or stretches sufficiently to permit its use on the rear of the shoe.

Having now fully described my invention, what I claim as new, and desire to secure by Letters Patent, is—

1. An overshoe-fastener, formed of a resilient strip, having oppositely-disposed angular portions at its ends, slits formed in one end, and a bail in said slits.

2. An overshoe-holder, having a portion to engage the shoe and a part to engage the overshoe, a bearing formed in one end, a bail in said bearing, and oppositely-disposed bends in said fastener, substantially as described.

In testimony whereof I affix my signature in presence of two witnesses.

JACKSON MARDIS.

Witnesses:
W. F. JACKSON,
W. J. MAKIM.